United States Patent [19]

Shead et al.

[11] 4,000,877
[45] Jan. 4, 1977

[54] MOULDING

[75] Inventors: Terence H. C. Shead, Chorley Wood; David G. Wills, St. Albans, both of England

[73] Assignee: Worldwide Plastics Development Limited, Wolverhampton, England

[22] Filed: Apr. 9, 1975

[21] Appl. No.: 566,343

[30] Foreign Application Priority Data

Apr. 25, 1974 United Kingdom ............ 18179/74

[52] U.S. Cl. .................................. 249/82; 249/91; 425/110; 425/125
[51] Int. Cl.[2] .......................................... B29C 11/00
[58] Field of Search .......... 425/110, 111, 123, 124, 425/125; 164/112, 334, 322; 249/82, 83, 88, 91, 151

[56] References Cited

UNITED STATES PATENTS

| | | | |
|---|---|---|---|
| 2,890,505 | 6/1959 | Brand | 249/91 |
| 3,046,013 | 7/1962 | Kutik | 425/123 |
| 3,221,378 | 12/1965 | Faas et al. | 164/334 |
| 3,344,848 | 10/1967 | Hall et al. | 164/312 |
| 3,363,040 | 1/1968 | Aoki | 425/125 |

*Primary Examiner*—Ronald J. Shore
*Attorney, Agent, or Firm*—Kane, Dalsimer, Kane, Sullivan and Kurucz

[57] ABSTRACT

The invention relates to a method of forming a moulded product comprising a reinforcement encapsulated in a plastics material. The reinforcement is supported in a mould cavity spaced from the surfaces of said mould cavity by support pins which are retractable into the mould surfaces. During an initial part of the moulding operation some of the plastics moulding material enters one or more reservoirs each formed in or around one of the support pins, the reservoirs opening into the mould cavity and extending inwardly of the mould surface, and on retraction of each pin, a piston, working in each reservoir, forces the moulding material out of the reservoir into the vicinity of the part of the mould cavity previously occupied by the pin.

5 Claims, 4 Drawing Figures

MOULDING

The invention relates to encapsulation moulding, and in particular to the production of a reinforced moulded product by introducing a moulding material into a mould cavity around reinforcement which is located in the mould cavity spaced from the mould surfaces by support pins at least some and usually all of which are retracted as the moulding material finds its way between the reinforcement and mould surfaces and takes over the function of supporting the reinforcement and spacing it from the mould surfaces.

The retraction of the pins does not take place until the moulding operation has advanced sufficiently for the moulding material to space the reinforcement reliably from the mould surface, and in practice it is difficult to ensure that the moulding material completely fills the cavities in the mould left on retraction of the support pins.

In accordance with the present invention in a method of forming a moulded product comprising a reinforcement encapsulated in a plastics material, the reinforcement being supported in a mould cavity spaced from the surfaces of the mould cavity by support pins which are retractable into the mould surfaces, during an initial part of the moulding operation some of the plastics moulding material enters into one or more reservoirs each formed in or around as support pin, the reservoirs opening into the mould cavity and extending inwardly of the mould surface, and on retraction of each pin, a piston working in each reservoir forcing the moulding material out of the reservoir into the vicinity of the part of the mould cavity previously occupied by the pin.

With this arrangement the moulding material necessary for filling the space occupied by the temporary support pin is made available locally for filling that space under substantially full moulding pressure. At the end of their movement the outer face of the pin and outer face of the piston may be substantially flush with and form part of the mould surface.

The volume of the reservoir cyclinder inwardly of the mould surface may be approximately the same as the volume of the mould cavity occupied by the pin so that the volume of the pin is replaced by an equal volume of moulding material. In practice, however, the volume of the reservoir cylinder may be a little less than the effective volume of the pin in view of the continued movement of the moulding material in the mould cavity towards the locality of the pin.

The piston may be an annular piston surrounding a cylindrical pin and working in a cylindrical cavity opening into the mould surface, in which case moulding material may enter the reservoir cylinder whilst the pin is still in contact with and supporting the reinforcement. Alternatively, the piston may work in a cylindrical cavity in the pin, opening out of the end face of the pin. In this case the moulding material will enter the reservoir cylinder via a communicating channel which usually, but not necessarily, would be cut in the surface of the pin.

The drives for the pin and piston relatively to the mould may be synchronized and may be hydraulically or mechanically interconnected.

The invention is applicable to either injection or compression moulding and the reinforcement may be steel, hard plastics or other material. When applied to compression moulding of a thermosetting resin the reservoir cylinder may be cooled to delay the setting of the resin until after its transfer to the mould cavity. When applied to the injection moulding of a thermoplastic material, the reservoir may be heated to inhibit setting of the thermoplastic material, until the mould cavity is completely filled and the pin and piston have adopted their final positions.

Two examples of methods according to the invention will now be described with reference to the accompanying drawings in which.

Figure 1:
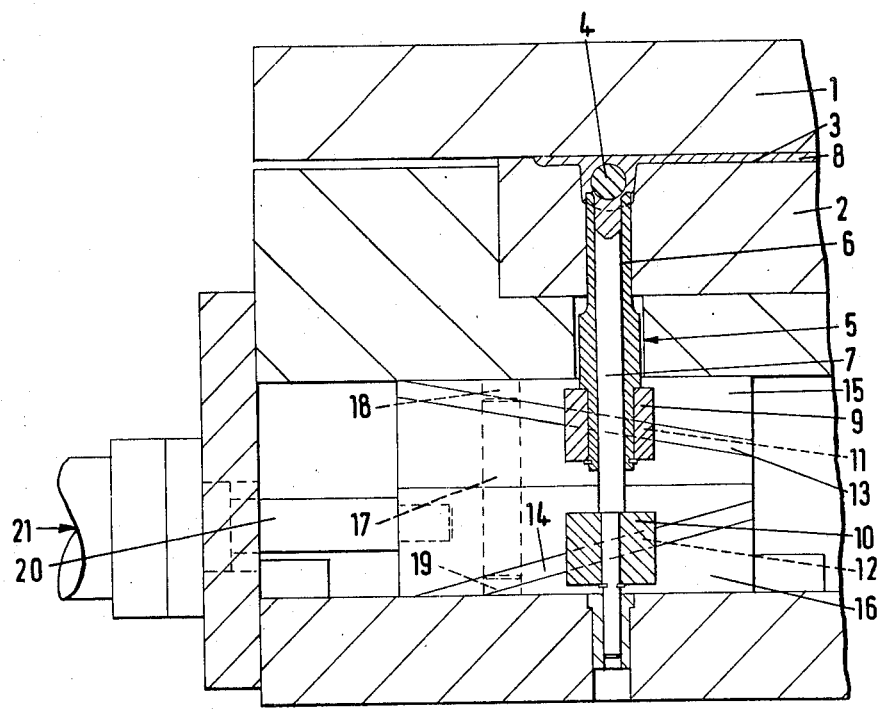
FIG. 1 is a partial section through a mould having a first type of retractable supporting pin.

The mould partly shown in FIG. 1 has two mould halves generally indicated 1 and 2. The mould half 1 has a substantially flat surface, whereas the mould half 2 has a profiled surface 3 in which a number of reinforcement bars 4 are located by means of support pins 5.

In this particular example, each support pin 5 is formed from a hollow tubular element 6 within which is arranged to slide a piston 7. The pin is shown, in FIG. 1, in its initial position supporting the reinforcement bar 4. As shown, a moulding material 8 has been introduced into the mould cavity and has entered into the upper end of the reservoir formed within the pin 5. This is possible because two opposite sides of the pin are recessed, so that as well as snugly supporting the reinforcement bar 4, a gap is left between the bar and the pin to enable the material to flow into the reservoir. The pin is fixed on a sliding block 9 and the piston 7 on a similar sliding block 10. Each of the sliding blocks 9 and 10 includes an angled projection or recess 11, 12 which cooperates with, respectively, either an angled slot or projection 13, 14 formed on the face of a horizontally slidable block 15, 16. These angled projections and slots allow movement of the pin and piston towards and away from the reinforcement 4 in response to horizontal movement of the sliding blocks 15 and 16. In order to ensure that movement of the pin 5 and piston 7 are simultaneous the sliding blocks 15 and 16 are constrained to move together by means of a dowel 17 fitted in bores 18 and 19 in the blocks 15 and 16. Movement of the blocks is by means of an actuating rod 20 screwed into the sliding block 16 and moveable by means of an hydraulic piston and cylinder 21.

Figure 2:
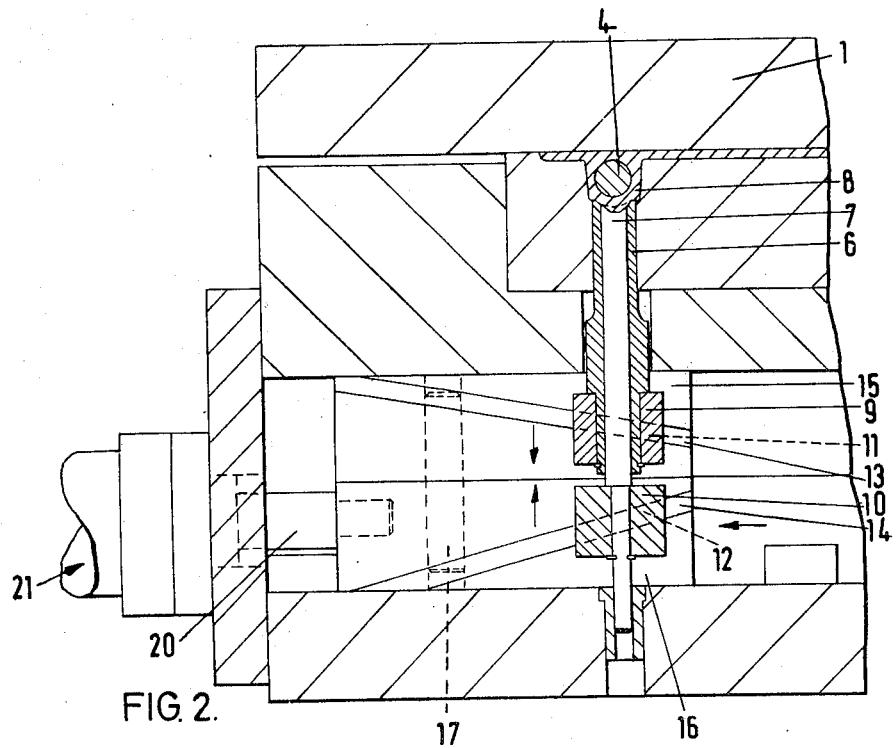
FIG. 2 is a section corresponding to that of FIG. 1, but showing the pin in its retracted position.

As can be seen from FIG. 2, when the sliding blocks 15 and 16 are withdrawn towards the left as seen in the Figure, the pin 6 is moved downwards and the piston 7 upwards until the position shown is reached in which case the moulding material completely surrounds the reinforcement element 4 and the pin and piston form together part of the cavity wall.

Figure 3:
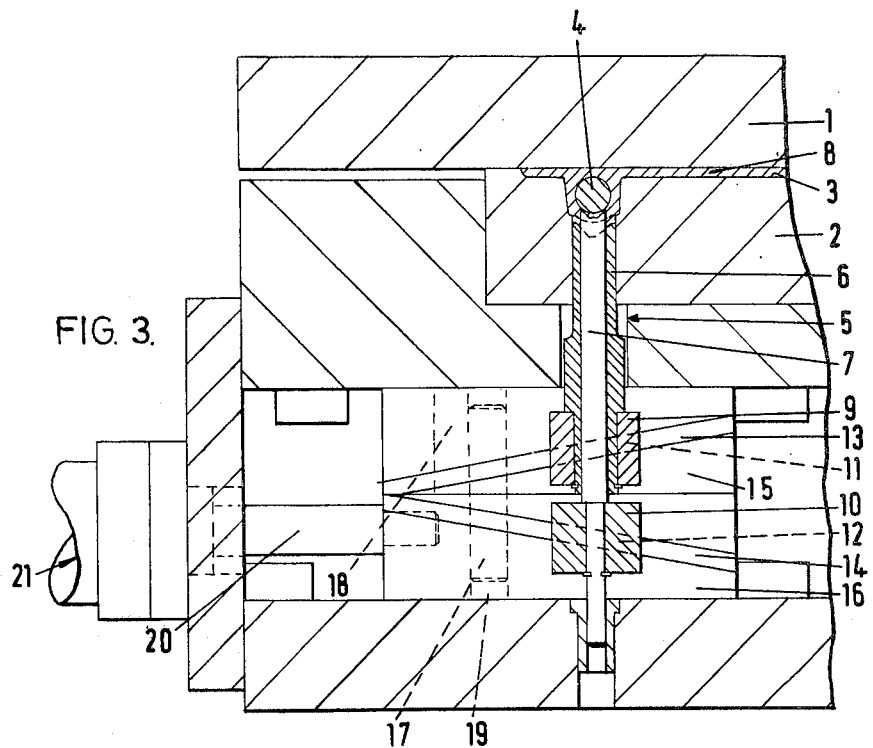
FIG. 3 is a view, similar to FIG. 1, showing a second type of retractable pin; and, FIG. 4 is a view of the mould shown in FIG. 3, but showing the pin in its retracted position.
Figure 4:
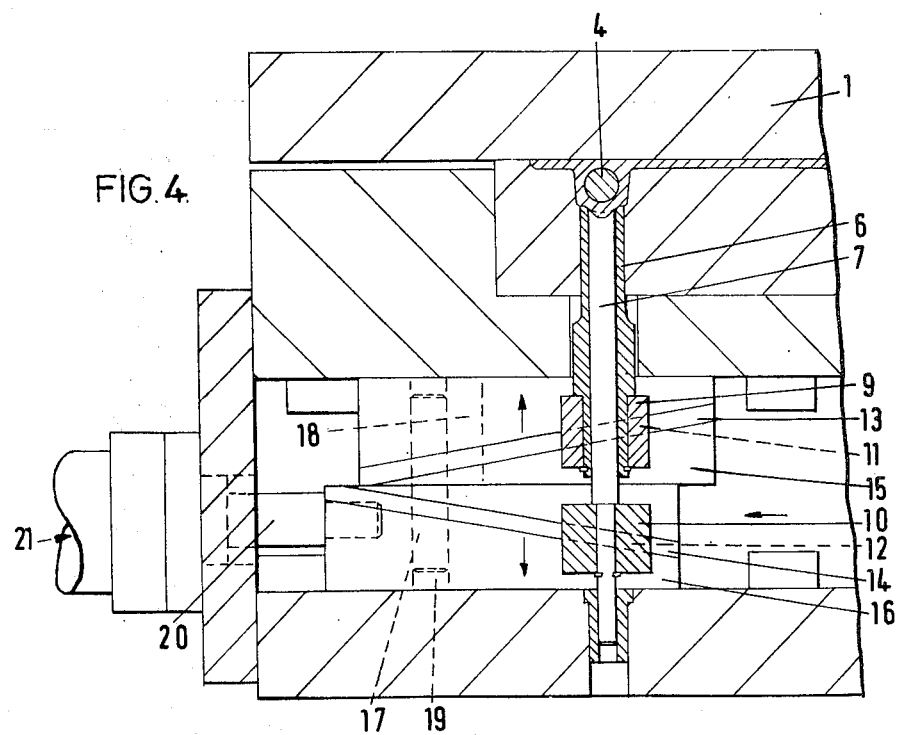

The apparatus shown in FIGS. 3 and 4 is very similar, like parts having the same reference numerals. However, in this case the piston 6 is annular and surrounds the support pin 7. Again, the piston and pin are slideable on blocks 9 and 10 which are in turn moved by horizontally sliding blocks 15 and 16. However, in this case, the pin and piston are not arranged to move simultaneously, but are arranged to move in synchronism, the piston being arranged to move only after the pin has started to be retracted from the reinforcing element 4. This delayed action is achieved by means of a dowel 17 which is fixed in a bore 19 in the sliding block 16 and a wider slot or bore 18 provided in the sliding block 15. Thus, as the block 16 is moved towards the left only when the left hand edge of the dowel 17 engages the left hand wall of the bore or slot 18 does the piston 7 begin to move upwards. This delayed movement may be required only in certain circumstances, for example, so that the continuing flow of material in the mould fills up most of the void left by the piston, or, alternatively, movement of the pin itself may be delayed in order to pressurise the moulding material so as to shorten the time required to fill the void left by the pin on retraction.

We claim:
1. Apparatus for forming a moulded product comprising a reinforcement encapsulated in a plastic moulding material, the apparatus comprising a mould, said mould including a plurality of support pins for the temporary support of said reinforcement in said mould, and at least one of said pins being retractable into the surface of said mould, wherein at least one reservoir is provided in said mould, each reservoir being formed in or around a retractable support pin, opening into said mould, extending inwardly of said mould surface, and containing therein a piston, the reservoir being positioned so that during an initial part of a moulding operation some of said plastics moulding material enters the reservoir, and means for retracting said pin and means for moving said piston outwardly on retraction of said pin to force said moulding material out of the reservoir into the vicinity of the part of said mould previously occupied by said pin.

2. Apparatus according to claim 1, wherein at least one of said pins is cylindrical, and at least one of said pistons is annular and surrounds said cylindrical pin, said piston working in a cylindrical cavity surrounding said pin and forming said reservoir.

3. Apparatus according to claim 1, wherein at least one of said pistons is circular in cross-section, each of said pistons working within a cylindrical cavity formed within one of said pins, said cavity opening into said mould at an end face of said pin.

4. Apparatus according to claim 1, wherein means are provided for moving said pin and said piston in synchronisation.

5. Apparatus according to claim 4, wherein said means moves said pin and said piston simultaneously.

* * * * *